B. C. KNUDSEN.
AUTOMOBILE RADIATOR HEATING APPARATUS.
APPLICATION FILED DEC. 5, 1912.

1,124,462.

Patented Jan. 12, 1915.
6 SHEETS—SHEET 1.

Witnesses:
P. J. Thorn
C. F. Terhune

Inventor:
Becker Chr. Knudsen

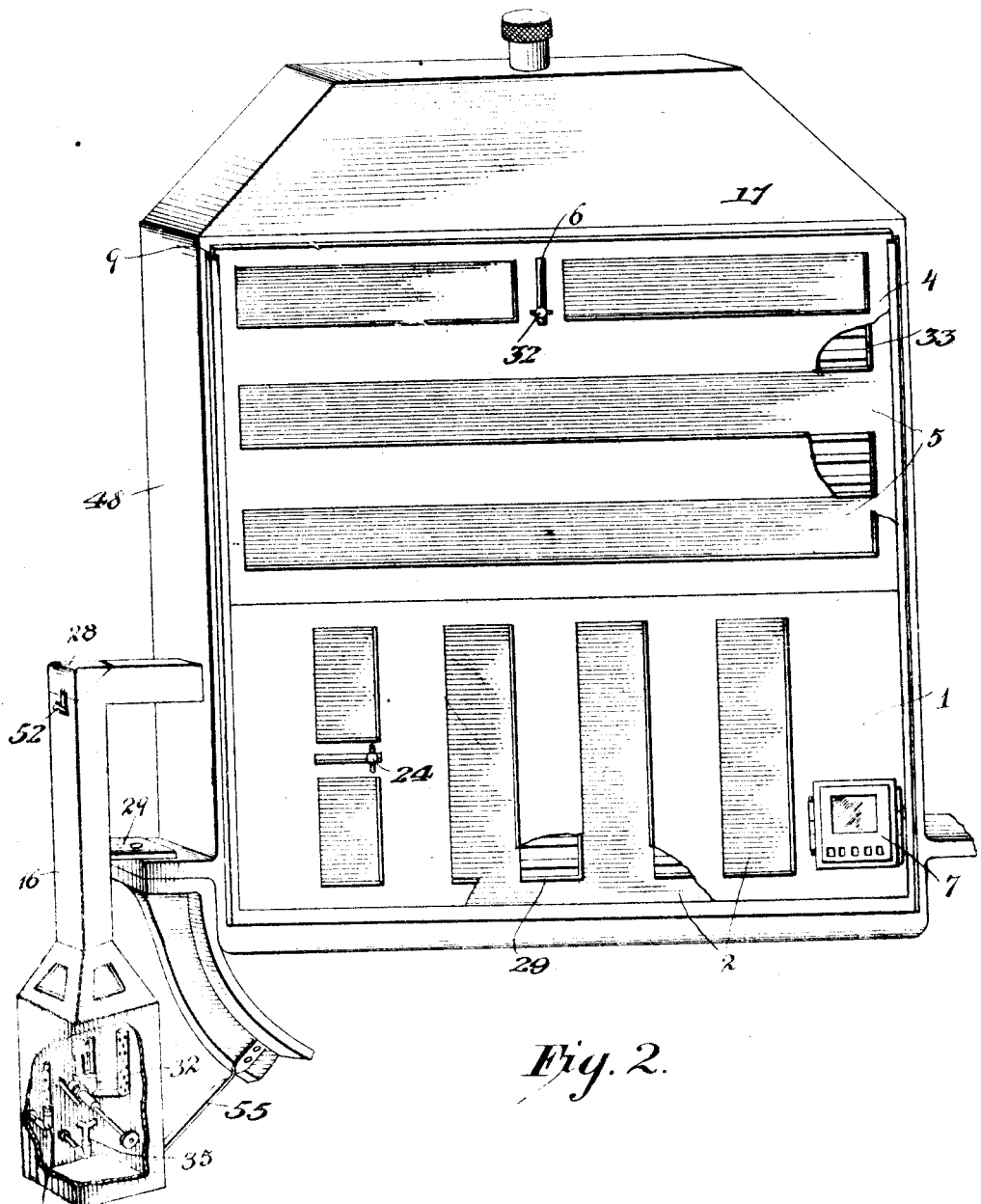

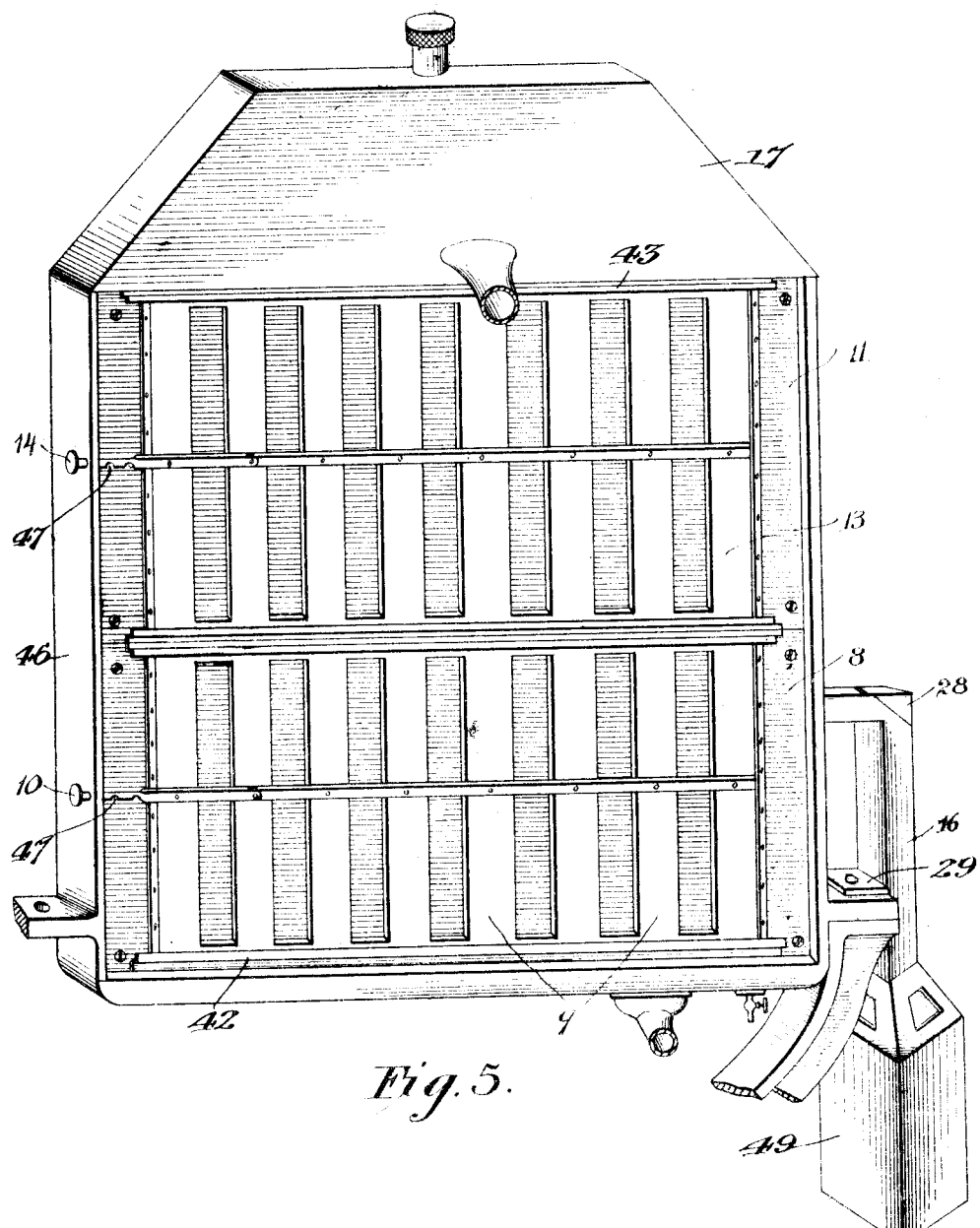

UNITED STATES PATENT OFFICE.

BECKER CHR. KNUDSEN, OF CLINTON, IOWA.

AUTOMOBILE RADIATOR-HEATING APPARATUS.

1,124,462.  Specification of Letters Patent.  Patented Jan. 12, 1915.

Application filed December 5, 1912. Serial No. 735,169.

*To all whom it may concern:*

Be it known that I, BECKER C. KNUDSEN, a resident of Clinton, in the county of Clinton and State of Iowa, a citizen of the United States, have invented a new and useful Automobile Radiator-Heating Apparatus, of which the following is the specification.

This invention relates to an automobile radiator heating apparatus, especially designed for the purpose of cooling internal combustion engines, of the type in which a liquid circulates through chambers surrounding the engine cylinders and also through small tubes or spaces in the body of a radiator, where the heat carried by the liquid from the engine cylinders, is thrown off by radiation, to the atmosphere.

My invention aims to provide, first, a radiator with means whereby the amount of air passing through the same can be regulated with a view to preventing the contents of the radiator from being frozen. Second, a heating apparatus that is simple in construction, durable, inexpensive to manufacture, easy to regulate, applicable to various types of radiators and highly efficient to the purposes for which it is intended.

With the above and other objects in view, the invention resides in the novel construction, combination and arrangement of parts to be hereinafter specifically described and then claimed.

Reference will now be had to the drawings, wherein—

Figure 7:
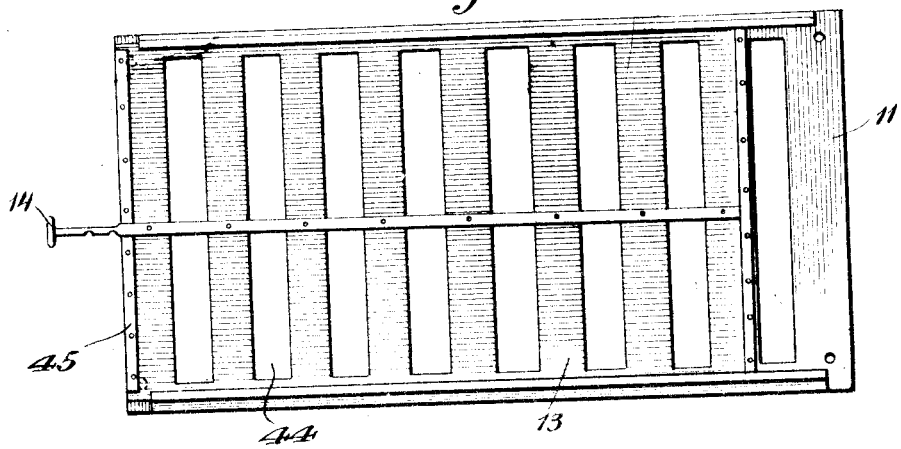
Figure 6:
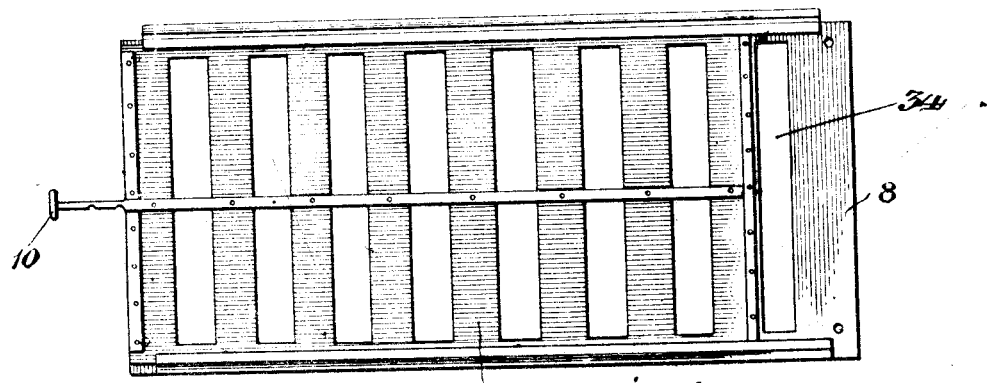
Figure 1:
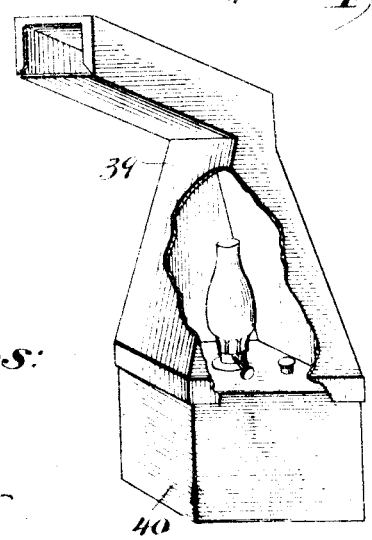
Figure 4:
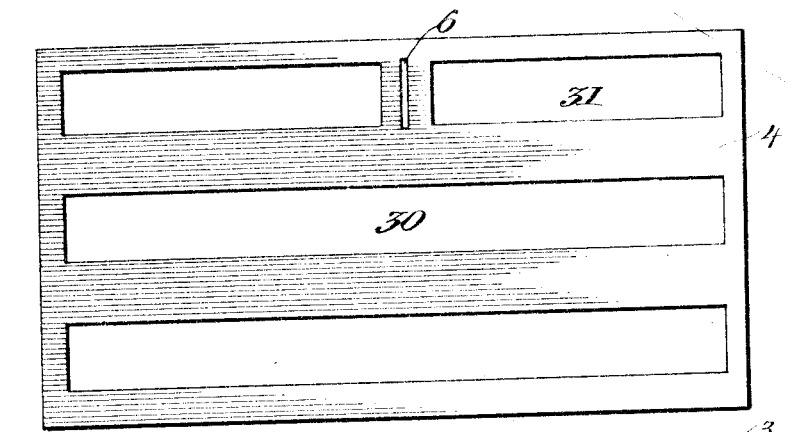
Figure 3:
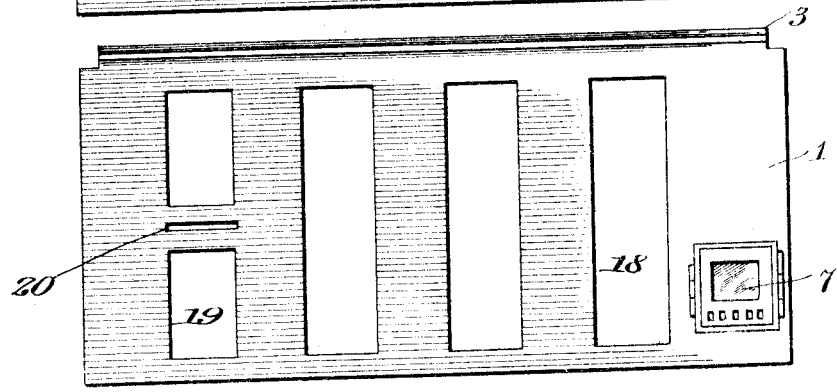
Figure 9:
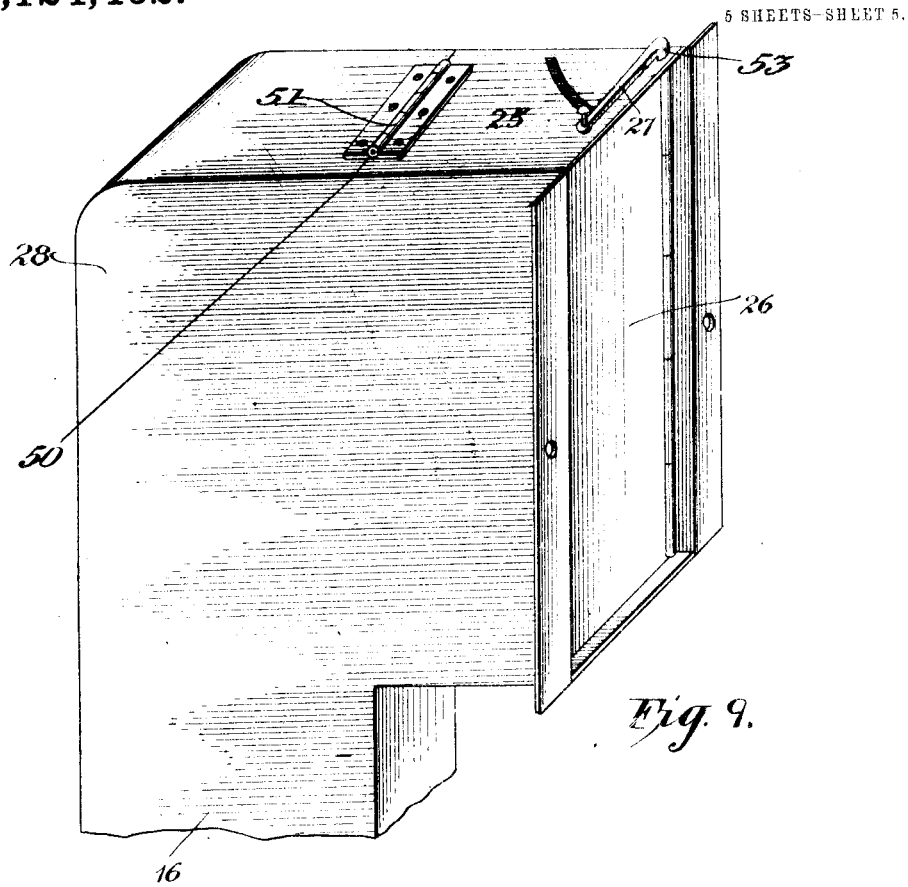
Figure 8:
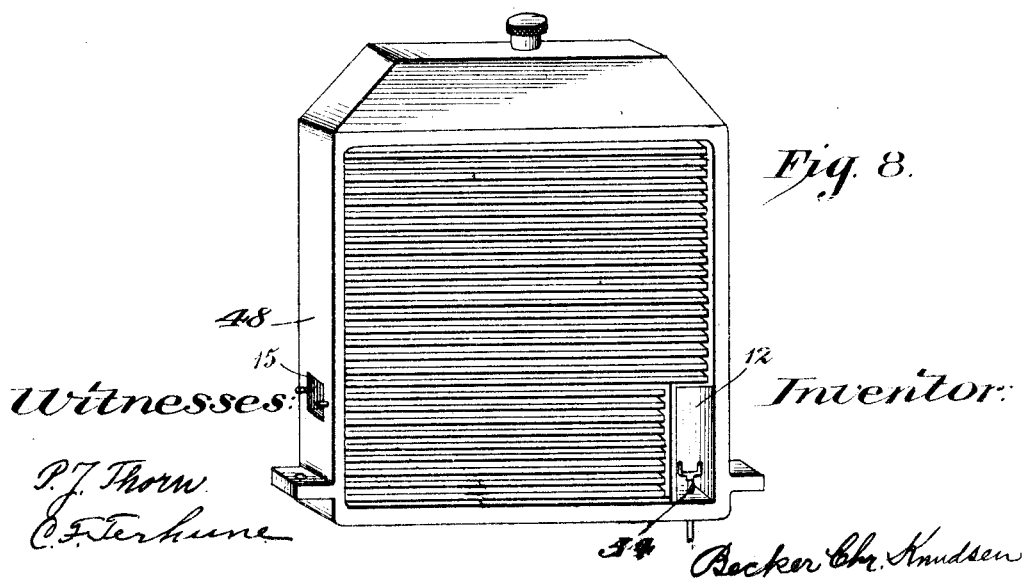

Figure 1 is a perspective view of a lamp casing, partly broken away and partly in section, illustrating a heating medium for the contents of a radiator; Fig. 2 is a perspective view of a radiator in accordance with this invention, illustrating the heating medium partly broken away and partly in section; Fig. 3 is a front elevation of the lower section of radiator cover; Fig. 4 is a similar view of the upper section of said cover; Fig. 5 is a perspective view of a radiator illustrating the rear side thereof and a cover therefor; Fig. 6 is an elevation of the lower section of the rear cover of the radiator; Fig. 7 is a similar view of the upper section of the same cover; Fig. 8 is a perspective view of a radiator illustrating a modified form of heating apparatus; Fig. 9 is an enlarged perspective view of a portion of the preferred form of heating apparatus shown in Figs. 2 and 5, and Fig. 10 is a detail sectional view of a portion of the radiator in accordance with my invention.

In describing my invention by the aid of the drawings herein referred to it is to be understood that the views are merely illustrative of one embodiment of the heating apparatus, and that the following description and claims are to be construed broadly as including substitute arrangements and constructions for those herein mentioned.

In the drawings, 17 denotes a conventional form of radiator, preferably of that type commonly styled a honey-comb or cellular construction. The front side of the radiator is provided with a U-shaped frame 9 constituting a holder and guides for a front cover, comprising a lower section 1 and an upper section 4. The upper edge of the lower section 1 has a longitudinal double flange 3, a portion of said flange extending into the radiator and engaging one of the water tubes thereof while the other flange supports the lower end of the section 4 of the front cover. The inwardly projecting portion of the flange 3 provides a horizontal partition at the front side of the radiator, said partition coöperating with a similar partition, to be hereinafter described, in dividing the radiator into two compartments. The lower section 1 of the front cover has vertically disposed openings 18 and 19 and between the openings 19 there is a longitudinal slot 20. The slot 20 receives and guides a button 24 carried by a shutter 2 arranged upon the inner side of the lower cover section 1. The shutter 2 is of less length than the section 1 and is provided with openings 29, corresponding in size and shape to the openings 18 and 19, whereby said openings can evenly register and admit air to the lower part of the radiator. The shutter 2 is adjusted relatively to the section 1 by the button 24. The upper section 4 of the front cover has longitudinal openings 30 and 31 and between the openings 31 there is a slot 6. This slot receives and guides a button 32 carried by a shutter 5 arranged against the inner side of the section 4. The shutter 5 has longitudinal openings 33 corresponding in size and shape to the openings 30 and 31 and by shifting the button 32 in the slot 6 the shutter 5 can be raised or lowered whereby the area of the openings admitting air to the radiator can be increased or decreased at will.

The rear side of the radiator 17 is closed by plates 8 and 11 constituting a rear cover and said plates are provided with vertical openings 34. Arranged between the confronting edges 8 and 11 is a longitudinal T-bar 37 having a lateral flange 38 that extends inwardly and engages one of the water tubes 39 of the radiator. The flange 38 coöperates with the flange 3 in dividing the radiator into a lower compartment and an upper compartment, and it is in the lower compartment that the heating medium is circulated to prevent the contents of the tubes 41 from freezing. The other flanges of the T-bar 37 serve as guides for shutters 9 and 13, the lower edge of the shutter 9 being supported and guided by an angle guide 42 and the upper edge of the shutter 13 guided by an angle guide 43. These guides are suitably secured to the cover plates 8 and 11, as best shown in Fig. 5. In the shutters 9 and 13 are vertical openings 44 corresponding in size and shape to the openings 34. Secured to the ends of the shutters are stiffening strips 45 and said strips are connected by longitudinal draw-bars 10 and 14, the bar 14 being riveted or otherwise connected to the shutter 13 and the bar 10 similarly connected to the shutter 9. The bars 10 and 14 extend from the ends of the shutters to protrude through the wall 46 of the radiator and the lower edges of said draw-bars, at the protruding ends thereof, are provided with notches 47. The protruding ends of the draw-bars are adjustable in openings provided therefor in the walls 46 of the radiator and the notches of these draw-bars are adapted to receive a wall of each opening whereby said shutters can be locked in adjusted position. The shutters 5 and 13 coöperate in controlling the passage of air through the upper part of the radiator and the shutters 2 and 9 coöperate in controlling the passage of air through the lower part of the radiator, which forms a compartment that can be heated from a suitable source located exteriorly of the radiator or interiorly thereof.

The wall 48 of the radiator 17 has an opening 15 communicating with the lower compartment of the radiator. Suitably connected to the wall 48 and in communication with the opening 15 is the angle-flue 16 of a heating apparatus which in preferred form, embodies a casing 49 containing an acetylene burner 35 that can be supplied with acetylene gas a suitable reservoir (not shown). A gasolene burner 32 and ordinary gas jets 36 are also located within the casing 49, either of which can be used in lieu of the acetylene gas burner. The three types of burners are located within the casing for the convenience of using different kinds of fuel and as an instance of another heating medium, reference is had to Fig. 1 showing an ordinary lamp located in the casing 40 having a flue 39 adapted to be connected to the walls 48 of the radiator at the opening 15. The flue 16 has the outer angle portion thereof cut away, as at 50, and provided with a door 28, which is hinged to the top 25 of the flue, as at 51. This door can be opened to permit smoke to escape, particularly when the gasolene burner 32 is placed in operation, otherwise the door 28 remains closed and is held in such position by a conventional form of latch 52, as best shown in Fig. 2 of the drawings.

The ends of the flue 16 adjoining the wall 48 of the radiator has a damper 26 which is attached to a vertical pivot rod 53 at one side of the flue. The upper end of the pivot rod 53 has a crank 27, the position of the crank corresponding to that of the damper, whereby it is easy to determine the position of the damper within a flue. The damper 26 controls the supply of heated air to the lower compartment of the radiator and when the heating apparatus is not in use the damper is closed.

An interior heating apparatus is illustrated in Fig. 8, wherein the radiator is provided with a small compartment 12 at the end of the lower compartment of the radiator. Within the small compartment 12 is located a burner 54 adapted to be supplied with gas from a suitable source. When the interior heater is used, the lower section 1 of the front cover is provided with a door 7 (see Figs. 2 and 3), said door having a sight opening and ventilating opening and it is through the medium of this door that easy access is had to the compartment 12.

The exterior heating apparatus can be supported by brackets 29 and 55 from the supporting means of the radiator or any other part of an automobile.

From the foregoing it will be observed that the shutters of the radiator can be completely closed in the winter time and the heated air supplied to the lower compartment of the radiator, whereby the water tubes 41 will be heated and consequently the water within said tubes, which circulates through the jackets of the engine cylinders, and places said engine in condition for operation. It is through the medium of the various shutters that the heating of the water within the tubes 41 can be regulated to any degree and in the summer time the shutters can be thrown wide open or the front and rear plates bodily removed from the radiator.

Heated air has been cited as an example of heating medium that I may use and the inlet to the lower compartment of the radiator may be at any point convenient to the location of the heating medium.

What I claim is:—

1. The combination with a radiator having tubes, of sectional front and rear plates arranged against the front and rear sides of the radiator, guide ribs arranged between the sections of each plate and coöperating with the tubes of the radiator in providing a horizontal partition that divides said radiator into compartments, slide shutters movable against the inner side of said front plate, slide shutters movable against the outer side of said rear plate, and a heating apparatus having a flue in communication with one of the compartments of said radiator.

2. The combination with a radiator having tubes, of sectional front and rear plates carried thereby, guide ribs arranged between the sections of each plate and coöperating with the tubes of said radiator in providing a horizontal partition dividing said radiator into compartments, slide shutters movable against the inner side of said front plate and operatable from the outer side thereof, slide shutters movable against the outer side of said rear plate and operatable from the side of said radiator, and a heating apparatus having a flue in communication with the lowermost compartment of said radiator.

3. The combination with a radiator having tubes, of sectional front and rear plates carried thereby, guide ribs arranged between the sections of each plate and coöperating with the tubes of said radiator in providing a horizontal partition dividing said radiator into compartments, slide shutters movable against the inner side of said front plate and operatable from the outer side thereof, slide shutters movable against the outer side of said rear plate and operatable from the side of said radiator, a heating apparatus having a flue in communication with the lowermost compartment of said radiator, and means carried by the flue of said heating apparatus for controlling the communication between said apparatus and the compartment of said radiator.

4. The combination with a radiator having tubes, of sectional front and rear plates arranged against the front and rear sides of the radiator, guide ribs arranged between the sections of each plate and coöperating with the tubes of the radiator in providing a horizontal partition that divides said radiator into compartments, slide shutters movable against one side of said front plate, slide shutters movable against one side of said rear plate, and a heating apparatus having a flue in communication with one of the compartments of said radiator.

5. The combination with a radiator having tubes, of sectional detachable front and rear covers against the front and rear sides of the radiator, a horizontal ridge forming part of said covers and in contact with the tubes of said radiator and coöperating therewith in forming a horizontal partition that divides said radiator into compartments, and a heating apparatus having a flue in communication with one of the compartments.

BECKER CHR. KNUDSEN.

Witnesses to signature:
JOHN H. EDENS,
ELLA F. GRIMES.